United States Patent [19]

Heyes

[11] Patent Number: 5,238,517
[45] Date of Patent: Aug. 24, 1993

[54] PRODUCTION OF LAMINATED MATERIALS

[75] Inventor: Peter J. Heyes, Wantage, England

[73] Assignee: CMB Foodcan plc, Worcester, England

[21] Appl. No.: 899,949

[22] Filed: Jun. 17, 1992

Related U.S. Application Data

[63] Continuation of Ser. No. 704,836, May 20, 1991, abandoned, which is a continuation of Ser. No. 509,200, Apr. 16, 1990, abandoned, which is a continuation-in-part of Ser. No. 377,822, Jun. 9, 1989, abandoned.

[30] Foreign Application Priority Data

Oct. 15, 1987 [GB] United Kingdom ............ 8724244
Oct. 12, 1988 [WO] PCT Int'l Appl. ............ PCT/GB88/00850

[51] Int. Cl.$^5$ ............................................. B32B 31/14
[52] U.S. Cl. ............................... 156/243; 156/244.11; 156/244.23; 156/244.24; 156/244.27; 156/498; 156/500; 118/69; 118/400; 118/405; 118/410; 118/423; 118/602
[58] Field of Search ............ 156/243, 244.11, 244.23, 156/244.24, 244.21, 498, 500; 118/69, 101, 400, 405, 410, 423, 602, DIG. 4; 266/46, 102, 114, 130, 131, 133, 159; 427/398.3

[56] References Cited

U.S. PATENT DOCUMENTS

| T104,502 | 8/1984 | Liu | 156/244.11 |
|---|---|---|---|
| 2,732,319 | 1/1956 | Cree | 118/69 |
| 2,833,672 | 5/1958 | Laubscher et al. | 118/69 |
| 3,013,900 | 12/1961 | Yezek et al. | 118/69 |
| 3,112,226 | 11/1963 | St. Jean | 118/405 |
| 3,323,965 | 6/1967 | Hanle et al. | 156/243 |
| 3,376,183 | 4/1968 | Flynn et al. | 156/244.27 |
| 3,402,086 | 9/1968 | Smith et al. | 156/244.24 |
| 3,503,823 | 3/1970 | Richart et al. | 156/244.27 |
| 3,679,513 | 7/1972 | Addinall et al. | 156/309.9 |
| 3,826,628 | 7/1974 | Addinall et al. | 29/195 |
| 3,853,306 | 12/1974 | Padjen et al. | 118/69 |
| 4,486,009 | 12/1984 | Kopf | 266/114 |
| 4,517,255 | 5/1985 | Kanda et al. | 156/322 |
| 5,093,208 | 3/1992 | Heyes et al. | 428/623 |

FOREIGN PATENT DOCUMENTS

| 752597 | 12/1970 | Belgium | 118/69 |
|---|---|---|---|
| 062385 | 3/1986 | European Pat. Off. | |
| 2120195 | 11/1971 | Fed. Rep. of Germany | |
| 3033528 | 4/1981 | Fed. Rep. of Germany | |
| 3227282 | 1/1984 | Fed. Rep. of Germany | |
| 57-22750 | 5/1982 | Japan | |
| 61-3676 | 2/1986 | Japan | |
| 3095935 | 4/1988 | Japan | 156/244.11 |
| 88/7626 | 8/1989 | South Africa | |
| 318480 | 7/1972 | U.S.S.R. | |
| 1028085 | 5/1966 | United Kingdom | |
| 1257620 | 12/1971 | United Kingdom | |
| 1324952 | 7/1973 | United Kingdom | |
| 1392590 | 4/1975 | United Kingdom | |
| 1471397 | 4/1977 | United Kingdom | |
| 2058281 | 4/1981 | United Kingdom | |
| 2123746 | 2/1984 | United Kingdom | |

OTHER PUBLICATIONS

Modern Packaging Encyclopedia, Jul. 1971, vol. 44, No. 7A, pp. 100–102.
V. E. Gul et al, "Fundamentals of Treating Plastics,"-πMoscow, Chemical Publishing House (Khimia), 1985, p. 169.

Primary Examiner—Caleb Weston
Attorney, Agent, or Firm—Burns, Doane, Swecker & Mathis

[57] ABSTRACT

A process and apparatus for producing a laminate of metal and a polymeric film such as polypropylene bonded to a metal substrate such as steel or aluminum strip, preferably electrolytically chromium coated steel for making can ends, comprises laminating a polypropylene film to the metal and subjecting the film to a temperature above its melting point, and then uniformly and rapidly cooling the laminate to a temperature substantially below the melting point of the polypropylene by flooding the polypropylene coated surface of the laminate with cold liquid, e.g., water at room temperature.

16 Claims, 3 Drawing Sheets

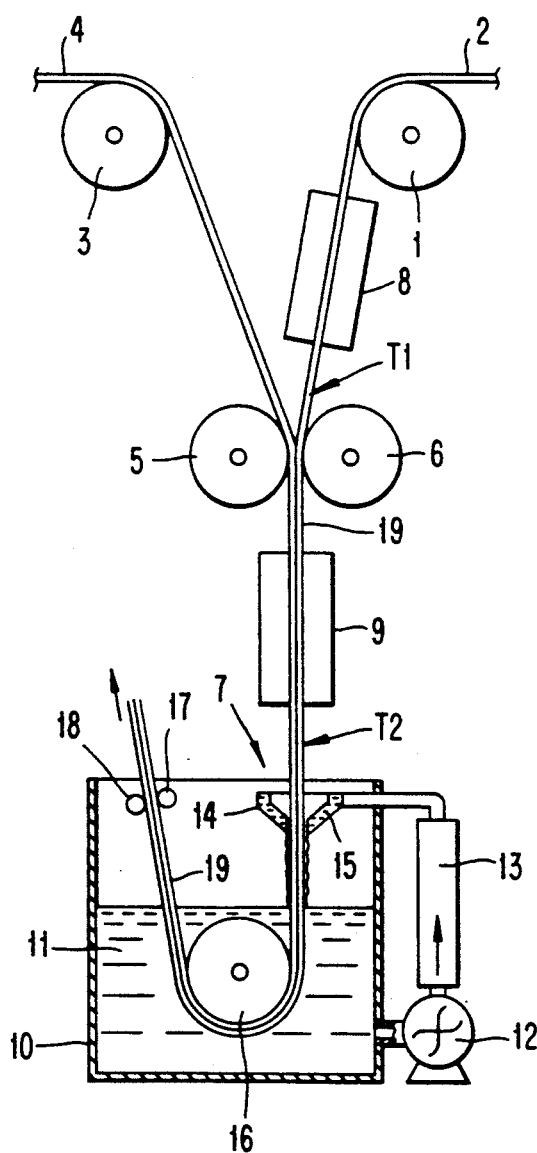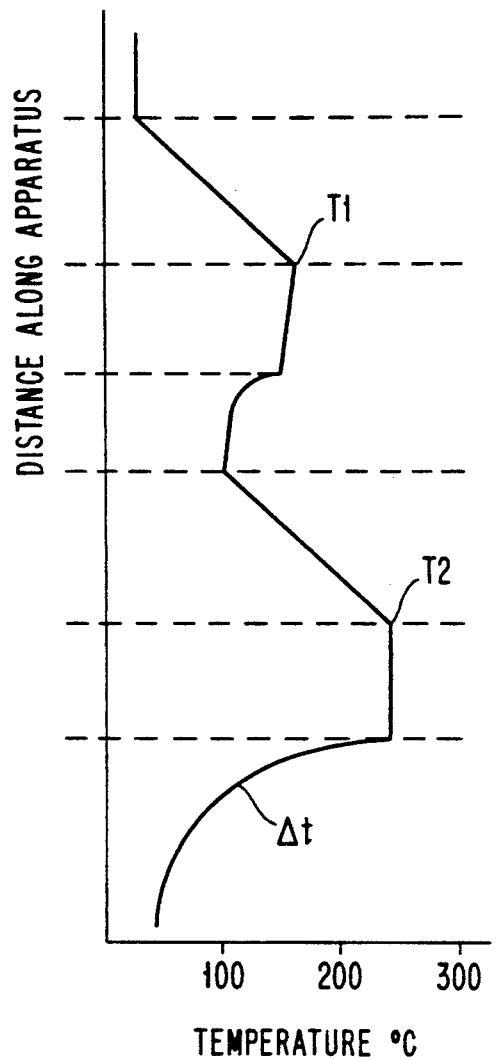

PRODUCTION OF LAMINATED MATERIALS

This application is a continuation of application Ser. No. 07/704,836, filed May 20, 1991 abandoned, which is a continuation of Ser. No. 07/509,200, filed Apr. 16, 1990 abandoned, which is a continuation in part of application Ser. No. 377,822, filed Jun. 9, 1989 abandoned.

This invention relates to the production of laminated materials comprising thermoplastic, especially polypropylene, bonded to a metal substrate.

It is known, for example from British Patent Specification No. 1324952, to laminate films of a polyolefin simultaneously to both major surfaces of a metal sheet and then to reheat the resultant laminate to a temperature above the melting point of the polyolefin to ensure adequate bonding of the polyolefin to the metal, followed by cooling of the laminated product. Specification No. 1324952 recommends cooling by forced air to lower the temperature of the coated substrate rapidly to below the softening point, followed by final rapid cooling under a water spray. It has been observed, however, that air cooling below approximately 180° C. or spray quenching from a higher temperature results in the coating becoming partially crystalline, with a relatively large crystal structure. Discontinuities can then appear in the coating on subsequent forming of the laminated material into shaped articles such as can ends, thereby exposing the metal substrate and rendering it liable to corrosive action by substances such as the contents of a can having such a can end. The shelf life of the can is thereby severely curtailed. U.S. Pat. No. 3,762,598 proposes a post-forming heat treatment for repairing the coating, but this would add to the operational and energy costs and is therefore undesirable.

It is an object of the present invention to provide a process for producing a laminated material comprising polypropylene bonded to a metal substrate, which will enable the coating to withstand forming operations without developing discontinuities to any substantial extent and which will therefore be more suitable for forming into articles such as can ends.

It is also an object of the present invention to provide a method and apparatus for producing a laminated material comprising thermoplastic bonded to a metal substrate, wherein fast, even quenching is attained.

According to the invention, in a process for producing a laminated material comprising polypropylene bonded to a metal substrate, a polypropylene film is laminated to at least one of the major surfaces of a metal sheet and subjected to a temperature above the melting point of the polypropylene and is then uniformly and rapidly cooled to a temperature substantially below the said melting point by flooding the polypropylene coated surface of the laminated material with cold liquid. The term "flooding" is used to indicate that the liquid is caused to contact the polypropylene as a solid, unbroken, continuous flow.

It has been found that the more uniform and rapid cooling which can be achieved by flooding the coated surface with cold liquid reduces or eliminates the tendency for the coating to become partially crystalline and thereby reduces or eliminates the tendency to form discontinuities on subsequent forming of the laminated material.

Preferably the laminated polypropylene film is cooled through its melting point at a rate exceeding 200° C. per second.

The laminated polypropylene film is preferably cooled to a temperature not exceeding its softening point. The cold liquid is preferably water at room temperature.

The polypropylene film is preferably a co-extruded multilayer film comprising an inner layer of a bonding resin which is an acid-modified polypropylene and an outer layer of polypropylene. The bonding resin is preferably a maleic anhydride modified polypropylene.

The lamination is preferably effected by first laminating the polypropylene film to the metal sheet with the metal sheet at a temperature $T_1$ which is sufficient to cause softening of the polypropylene film but is below the temperature at which the outer surface of the polypropylene film would be damaged during lamination and then re-heating the resultant laminate to a temperature $T_2$ which is above the melting point of the polypropylene, followed by the uniform and rapid cooling. Preferably the temperature $T_1$ is in the range from 120° to 230° and the temperature $T_2$ is in the range from 210° C. to 270° C.

Advantageously another polymer film is laminated to the other major surface of the metal sheet simultaneously with the lamination of the polypropylene film. The second polymer film is typically based on a polyolefin or polyester resin or a composite film comprising polyolefin and polyamide. Such films are described in our copending British Patent Applications Nos. 8724237, 8724246, 8724240 and 8724242 filed Oct. 15, 1987.

The metal substrate to which the polymer film or films are applied, typically in the form of metal strip, is generally steel or aluminium or alloys thereof, typically a steel or aluminium based product used in the packaging industry.

The gauge range is typically 0.05 mm to 0.4 mm for steel and 0.02 mm to 0.4 mm for aluminium.

The steel may be coated with tin, preferably passivated by conventional chromic treatments, or alternatively may be in the form of nickel or zinc plated steel, blackplate or phosphated blackplate, which is preferably chromate rinsed after phosphating.

The preferred steel finish is electrolytically chromium coated steel (ECCS) with a dual layer of chromium metal and chromium oxide. With such steels, the chromium metal and chromium oxide levels can vary widely. Typically, the chromium metal content ranges from 0.1 to 0.20 gm/m$^2$, while the chromium oxide ranges from 0.005 to 0.05 gm/m$^2$. The ECCS is commonly derived from deposition systems containing either sulphur containing or fluorine containing catalysts.

The invention also resides in an apparatus for producing a laminated material comprising thermoplastic bonded to a metal substrate, said apparatus comprising means for feeding a metal strip and a strip of thermoplastic film to a laminating nip, means for heating the metal strip to a temperature above the softening temperature of the thermoplastic before it reaches the laminating nip, means for reheating the laminate of metal and thermoplastic after it leaves the laminating nip to a re-heat temperature (which in the case of polypropylene desirably is the temperature above its melting point), and means for applying a flood of cold liquid to the polypropylene coated surface of the laminate so as to cool the thermoplastic rapidly and uniformly to a temperature substantially below the re-heat temperature. The means for applying a flood of cold liquid may comprise a pair of distributor bars arranged one on each side of the laminate and inclined to its direction of travel to direct the cold liquid along the direction of travel, or alternatively may comprise a trough having an inlet for cold liquid in its upper part and converging walls which define a slot at its bottom, through which a vertically descending run of the laminate can pass with the liquid.

The invention also resides in a laminated material produced by a process as outlined above.

Laminated materials so produced have been compared with similar materials produced by similar laminating techniques but followed either by air cooling or by a water spray quench. Can ends formed from the respective laminated materials have been tested for discontinuity of the coatings with the result that disruption of the coating has been found to be evident on the can ends formed from the spray quenched and the air cooled materials but not on the can ends produced from the laminated materials produced in accordance with the present invention.

Specific embodiments of the invention will now be described in more detail by way of example and with reference to the accompanying drawings, in which:

FIG. 1 is a diagrammatic sketch of an upright apparatus for laminating two strips of material;

FIG. 2 is a graph of the temperature of the strips plotted against the distance along the apparatus;

Figure 3:
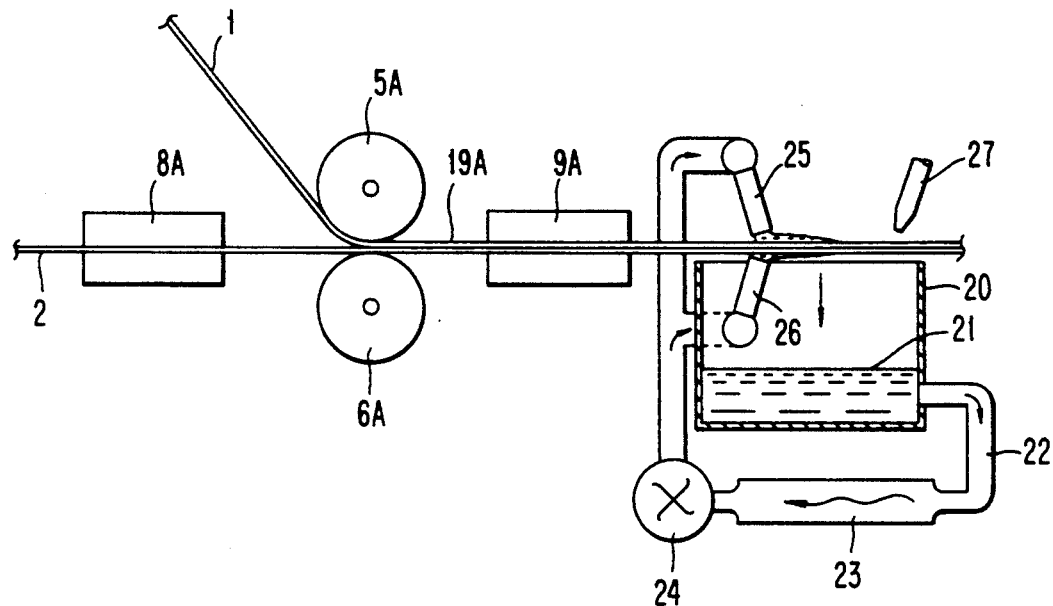
FIG. 3 is a diagrammatic sketch of a horizontal apparatus for laminating two strips.

In FIG. 1 it will be seen that the apparatus comprises a first roll 1 over which a metal strip 2 is passed, a second roll 3 over which a strip of polypropylene film 4 is passed, pinch rolls 5, 6 which bring the metal strip 2 and polypropylene film 4 together, and a quenching apparatus 7 which immerses the laminate 19 of metal and film in a copious flood of cooling liquid.

A preheater 8 is located between the roll 1 and pinch rolls 5, 6 and serves to preheat the metal strip 2 to a temperature $T_1$ above the softening point of the polypropylene before laminating at the pinch rolls 5, 6. A second heater 9 is located between the pinch rolls 5, 6 and the quenching apparatus 7 and serves to reheat the laminate to a temperature $T_2$ higher than the preheat temperature $T_1$ and higher than the melting point of the polypropylene. The quenching apparatus 7 comprises a reservoir 10 for containing a coolant liquid 11, such as water, a pump 12 to draw liquid from the reservoir, a heat exchanger 13 to cool liquid delivered by the pump, and distributor bars 14, 15 which receive cooled liquid from the heat exchanger 13 and distribute the liquid along a line across each major surface of the laminate 19. Each distributor bar 14, 15 is shaped to deliver a copious defined flow of liquid and to act as a weir to ensure flooding of the laminate across its entire width. In order to minimise any splash back, the delivery bars 14, 15 are inclined at an acute angle to the laminate 19 upstream so that the flow of liquid is directed along the direction of travel of the laminate.

The angle of inclination of the delivery bars 14, 15 to the upstream portion of the laminate may be from 40° to 80°, preferably from 60° to 80°, in order to ensure that the coolant liquid will travel with the laminate and not splash back on to upstream portions of the laminate.

It will be noticed that the cooling liquid travels with the laminate 19 downwards into the liquid 11 in the reservoir 10 so that a prolonged period of quenching is achieved before the quenched laminate passes round a turn roll 16 for removal from the apparatus. The turn roll 16 is preferably rotatably mounted for rotation on bearings in the walls of the reservoir 10. The quenched laminate is preferably passed between a pair of rolls 17, 18 which wipe off the cooling liquid. Alternatively rubber wiper blades could be used.

Referring to FIGS. 1 and 2, the method of lamination will be understood to comprise the steps of passing the polypropylene film strip 4 across roll 3 to the pinch rolls 5, 6; passing metal strip 2 across roll 1 through the preheater 8, to elevate its temperature to a temperature $T_1$ higher than the softening point of the polypropylene, and onwards to meet the polypropylene film at the pinch rolls 5, 6; laminating the film to the strip between the pinch rolls 5, 6 and passing the newly formed laminate 19 to the heater 9, reheating the laminate to a temperature $T_2$ which is greater than preheat temperature $T_1$ and higher than the melting point of the propylene to ensure adhesion of the polypropylene to the metal; and passing the heated laminate 19 between the distributor bars 14, 15 to receive a defined flow of cooling liquid applied as a flood across the width of both the major surfaces of the laminate so that the temperature of the laminate is reduced rapidly at a rate $\Delta t$ typically of the order of 200° C. per second.

Cooling liquid travels with the laminate 19 to be collected in the lower part of the reservoir 10 from which it is pumped by pump 12 through the heat exchanger 13 which controls the liquid temperature before recycling to the distributor bars 14, 15.

The quenched laminate is passed around roll 16 and between rolls 17, 18 and removed from the reservoir for drying and coiling for storage or use.

FIG. 3 shows an apparatus for laminating a polypropylene film to a metal strip in which the line of travel of the metal strip is substantially horizontal, although a slight downward slope may be used, e.g. about 5° to the horizontal, in order to compensate for any tendency for the laminate to sag in a catenary curve. As depicted, the apparatus has a preheater 8A, pinch rolls 5A, 6A and second heater 9A equivalent in function to the like components 8, 5, 6, 9 of FIG. 1 so that no further description is needed.

In FIG. 3 it will be seen that the quenching apparatus comprises a reservoir 20 containing cooling liquid 21, an outlet pipe 22 leading from the reservoir to a heat exchanger 23, and a pump 24 to pump liquid from the heat exchanger to distributor bars 25, 26 located above and below the laminate 19A respectively. The bars 25, 26 span the width of the laminate and are inclined at an angle of from 30° to 60°, preferably about 30°, to the direction of travel of the laminate to minimise any risk of liquid running upstream toward the heater 9A and to ensure that the cooling effect is prolonged by the liquid remaining in contact with the laminate for a period of time until it runs off into the reservoir 20. After a desired period of contact the liquid may, if desired, be swept off the laminate 19A by a draught of air from a jet bar 27 located above the laminate and if required, a further jet bar (not shown) below the laminate.

Figure 4:
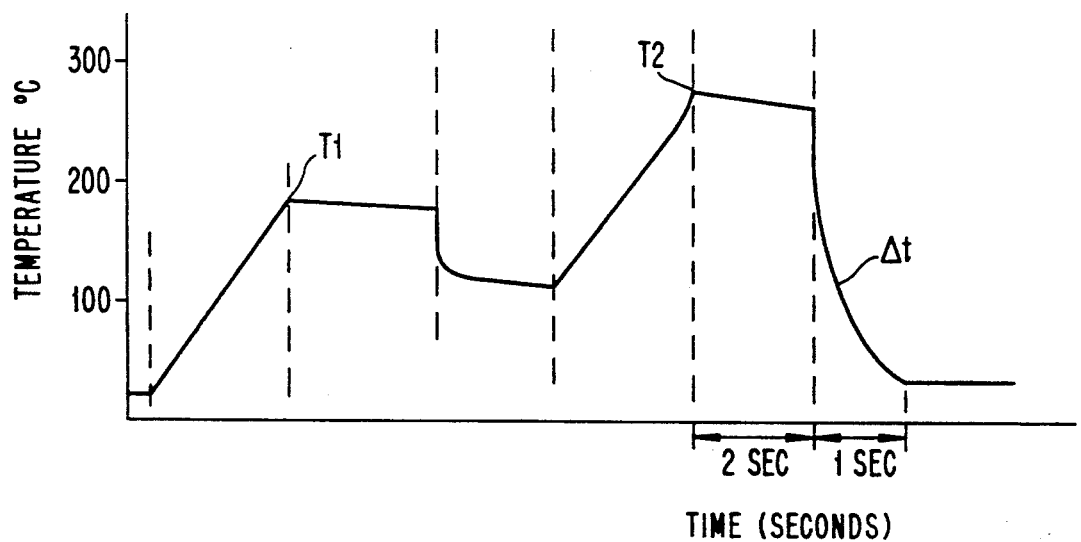
FIG. 4 is a graph of the temperature of the strips plotted against time.

FIG. 4 is a graph showing the temperature of the metal before and after lamination plotted against time. It will be noticed that, as in FIG. 2, considerable decrease in temperature occurs between the heaters, particularly during lamination of the cold polymer to the warm metal. Also it will be noticed that, as in FIG. 2, the rate of decrease in temperature during quenching is about 200° C. per second.

The method and apparatus described are particularly suitable for laminating polypropylene film to sheet metal strip such as tinplates, blackplates, electrolytically chrome coated steels (ECCS), aluminium, or aluminium alloys.

Figure 5:
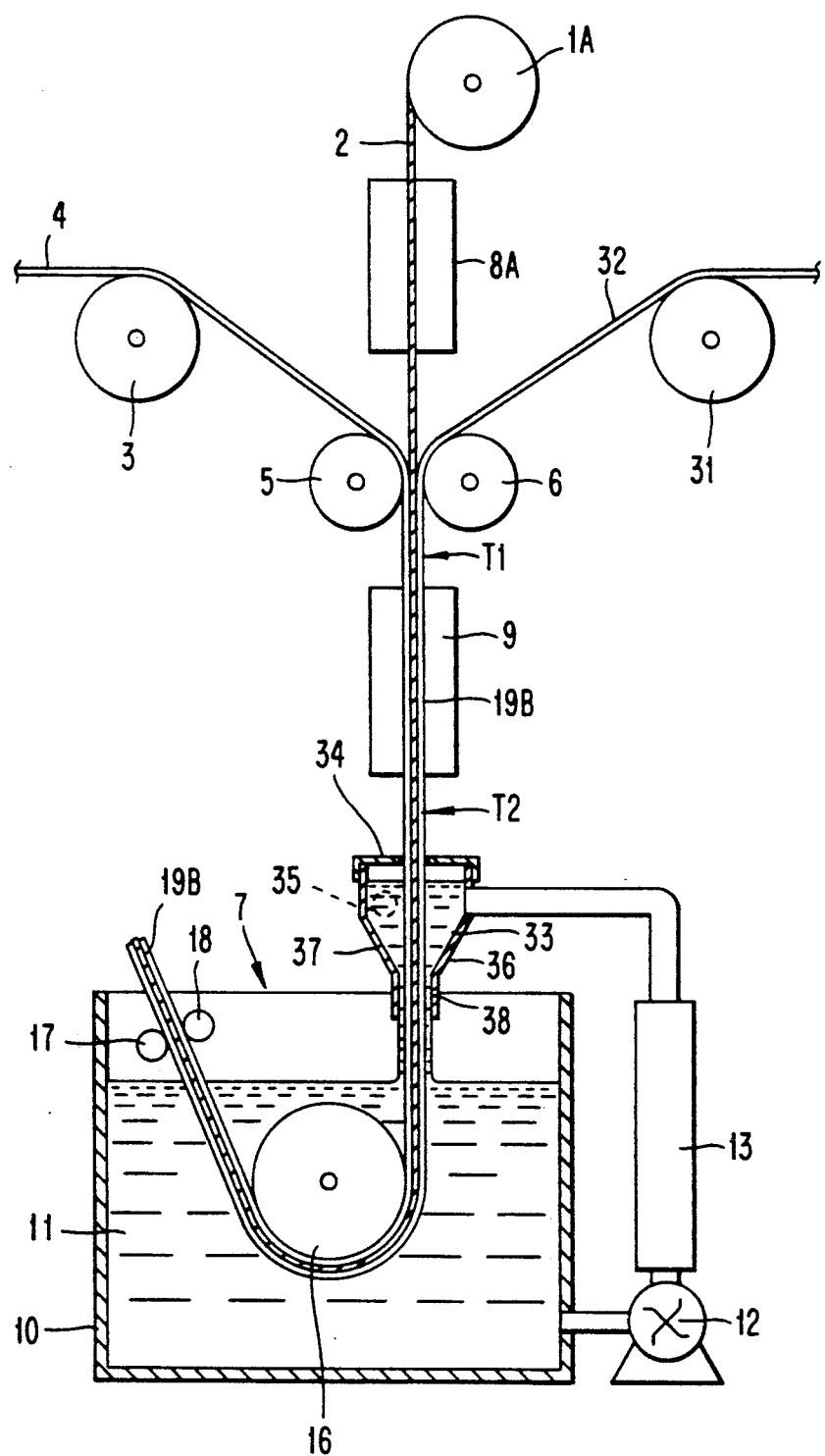
FIG. 5 is a diagrammatic sketch of an apparatus for laminating three strips.

FIG. 5 shows apparatus for simultaneously laminating a polypropylene film strip 4 to a first major surface of a metal strip 2 and second polymeric film 32 to the second major surface of the metal strip 2 to form a laminate 19B.

The apparatus of FIG. 5 is similar to that shown in FIG. 1 in that the polymer feed roll 3, pinch rolls 5, 6, pre-heater 8, second heater 9, reservoir 10, pump 12, heat exchanger 13 and wiping rolls 17, 18 are identical to those shown in FIG. 1.

However, in FIG. 5 a second polymer feed roll 31 has been added and the direction of feed of metal strip 2 from roll 1A is vertical through the preheater 8 to the pinch rolls 5, 6. This vertical path for the metal is advantageous because it permits the relatively heavy metal to hang straight without risk of developing a catenary curve, which may tend to distort the strip in the apparatus of FIGS. 1 and 3.

In FIG. 5 a trough 33 replaces the hollow distributer bars 14, 15 of the apparatus of FIG. 1. The trough 33 is substantially funnel-shaped in cross-section, having converging wall portions 36, 37 which define a slot 38 at the bottom through which the laminate 19B passes with a clearance on each side so that cooling liquid is able to pass with the laminate into the trough. The trough 33 extends across the entire width of the laminate 19B and a little beyond, so that the laminate is entirely flooded edge to edge with cooling liquid as it passes through the slot 38. In its simplest form the trough acts as a constant head device so that if the flow rate of cooling liquid is carefully controlled there may be no need for the lid 34 which is depicted to show how any splash back can be prevented. The lid is preferably made of transparent material to permit inspection of the liquid in the trough. Although the trough is depicted as being fed from one end through aperture 35, a better cooling liquid distribution may be achieved by feeding the trough from both ends. It is desirable to quench the laminate 19B evenly in order to avoid thermally induced distortion of the laminate.

The apparatus of FIG. 5 can be modified to provide a horizontal or near-horizontal run for the laminate 19B, on the same lines as the apparatus of FIG. 3.

It will also be appreciated that in all of its forms, the present invention contemplates that the thermoplastic film(s) 4 and/or 32 may be or comprise any thermoplastic, for example, polypropylene, polyethylene terephthalate (PET), PET copolymer (e.g., PET copolymerized with isophthalate), nylon, or even laminates of one or more of them. Such film laminates can be formed, for example, by coextrusion upstream of the rolls 3 and/or 31. Alternatively, adhesive may be used between layers of the laminate.

In the following tables various laminates and the treatments to manufacture them are described.

EXAMPLES

In the following Table 1, four laminate structures (A to D) are described. Specific examples of lamination conditions are described in Table 2, with reference to the lamination configurations in FIG. 5 or FIG. 5 modified on the lines of FIG. 3. Examples 1 to 4, 7, 8, 9, 10 and 12, particularly 7, 9 and 12 entail illustrations of the present invention.

Table 3 indicates the appearance of the coating after quenching and air drying. It was observed that if polypropylene reaches a temperature of approximately 270° C. immediately before quenching, degradation of the coating occurs in the quench in the form of coating fibrillation. Table 4 contains the results of enamel rater value tests on some of the examples of Table 2. Table 5 contains the results of accelerated tests of coating performance on examples 11 and 12.

Polypropylene coatings of 40 microns thickness quenched according to the invention, with water contacting one side of the strip, as a solid, unbroken, continuous flow or flood (Examples 1 to 4 and 10) have a glossy surface with slight coating haze. The crystalline structure shows a slight $\alpha$-form crystallinity and a largely smectic nature. (Crystallinity was assessed by analysis of the X-Ray Diffraction pattern of the laminated coating, particularly the height of peaks corresponding to $\alpha$-form crystals. Further details of the analysis technique are contained in our copending British Patent Applications Nos. 8724238 and 8724239.

By comparison, the air cooled (Example 13) and water spray cooled (Example 6) 40$\mu$ coatings have hazy and mottled hazy appearances respectively. Both have high $\alpha$-form crystallinity contents.

The particularly preferred form of quenching (Example 7) with unbroken, continuous water flow or flood in a line across a vertically moving laminated strip 19 or 19B (FIGS. 1 and 5) produces a very glossy coating with no haze and no $\alpha$-form crystallinity in 40 micron coatings.

The effect of quenching on the 40$\mu$ coating performance is described in Table 4. Laminated strip was formed into 65 mm diameter beverage can ends. The ends were assessed for coating continuity by the enamel rater test, a procedure well known in the can making business. Can ends were initially immersed in a dilute sodium chloride solution and ultrasonically agitated for 30 seconds to allow the solution to enter any discontinuities in the coating. The ends were enamel rated at 6.3 volts in a sodium chloride solution. The value in milliamperes is a guide to the area of metal substrate exposed by defects in the coating. Table 4 shows that materials of the invention (Examples 1 to 4, 7 and 10) have values significantly lower than the comparative Examples 6 and 13. The most preferred quench configuration (Example 7) gives very low levels of exposed steel. Acceptable ends have values less than 0.5 mA; if higher values are encountered the container shelf life is reduced by excessive iron dissolution.

Example 9 illustrates the improvement in coating structure gained by quenching both sides of the strip simultaneously; compare Example 9 (both sides quenched simultaneously) with Example 8 (single side quenched).

Example 12 illustrates the improvement in coating performance gained by quenching according to the invention, in an accelerated test simulating food storage. Comparative Example 11 has a significantly poorer performance in the accelerated test and in actual product contact.

The rate of quenching controls the extent of crystallinity in the coating. A relatively slow cooling process such as air blast induces a high level of $\alpha$-form crystallinity. A spray process cools the strip rapidly where the droplets impact but slowly around the drop impact zones, producing an inhomogeneous surface of both smectic and highly crystalline zones. A continuous, solid, unbroken linear flow or flood of cold water causing rapid and uniform cooling in a line across the strip produces a largely smectic coating. A fully smectic coating is achieved by cooling both sides simultaneously in this manner.

The presence of α-form crystallinity causes haziness in the coating which is undesirable. It also causes "voiding" in the coating when the laminate is deformed as in can or end making. The large α-form crystals deform in such a way that pathways are created in the coating, into which corrosive products will enter. Incorrectly quenched laminate can have excellent bond strength but poor shelf life and poor corrosion resistance due to voids.

Rapidly quenched laminate as described in the invention has a smectic polyolefin coating which does not produce voids on deformation and retains its excellent protection.

It will be understood that the thickness of polypropylene film used for laminates used to make articles of packaging will vary as required e.g. polypropylene film 3μ thick may be incorporated with other layers to make a beverage can end in contrast to which as much as 200μ of polypropylene film may be required on a valve mounting cup of an aerosol can to permit crimping to a cone top without use of a gasket.

TABLE 1

| Laminate | Film 4 | Film 32 | Metal 2 |
|---|---|---|---|
| A | Bond Resin (3μ) Polypropylene (37μ) | PET (15μ) | 0.24 mm ECCS 550 N/mm2 |
| B | Bond Resin (3μ) Polypropylene (37μ) | PET (15μ) | 0.30 mm ECCS 450 N/mm² |
| C | Bond Resin (3μ) Polypropylene (37μ) | Bond Resin (2μ) Polypropylene (18μ) | 0.21 mm ECCS 450 N/mm² |
| D | Bond Resin (10μ) | PET (15μ) | 0.21 mm ECCS |

TABLE 1-continued

| Laminate | Film 4 | Film 32 | Metal 2 |
|---|---|---|---|
| | Polypropylene (90μ) | | 550 N/mm² |

Note:
1. Bond resin is a maleic anhydride graft modified polypropylene random copolymer containing 0.2 ± 0.05% maleic anhydride.
2. PET is a biaxially oriented film having an outer layer of PET and an inner layer of a coplymer of ethylene isophthlate (20%) and ethylene terephthalate (80%).

TABLE 2

| Example | Material | $T_1$ (°C.) | $T_2$ (°C.) | Quench Configuration |
|---|---|---|---|---|
| 1 | A | 155 | 220 | Line (1,H) |
| 2 | A | 155 | 240 | Line (1,H) |
| 3 | A | 155 | 250 | Line (1,H) |
| 4 | A | 155 | 260 | Line (1,H) |
| 5 | A | 155 | 270 | Line (1,H) |
| 6 | A | 155 | 250 | Spray (2,V) |
| 7 | A | 155 | 250 | Line (1,H) |
| 8 | D | 180 | 250 | Line (1,H) |
| 9 | D | 180 | 250 | Line (2,H) |
| 10 | B | 155 | 250 | Line (1,H) |
| 11 | C | 155 | 250 | Spray (1,H) |
| 12 | C | 155 | 250 | Line (2,H) |
| 13 | A | 155 | 250 | Air (A,H) |

Notes:
1. $T_1$ is the metal temperature (measured by thermocouple) before lamination.
2. $T_2$ is the laminate temperature after the second heating stage (measured by monochromatic pyrometer utilising 3.4 micron wavelength) continuous.
3. Line denotes a continuous line impact of water on the strip as shown in FIGS. 1, 3 and 5.
4. Spray denotes a spray of water as discrete drops across the entire strip.
5. (1,H) indicated water impact on one side of the horizontal strip.
6. (2,H) indicates water impact on two sides of the horizontal strip.
7. (2,V) indicates water impact on two sides of the vertical strip.
8. (A,H) indicates air flow on one side of the horizontal strip.
9. In the horizontal configuration the strip was at a downward angle of 4° to the horizontal.

TABLE 3

| Example | $T_2$ (°C.) | Quench Configuration | Coating Appearance | Coating Structure |
|---|---|---|---|---|
| 1 | 220 | Line (1,H) | Glossy with very slight haze | Largely smectic, slight α-form crystallinity |
| 2 | 240 | Line (1,H) | Glossy with very slight haze | Largely smectic, slight α-form crystallinity |
| 3 | 250 | Line (1,H) | Glossy with very slight haze | Largely smectic, slight α-form crystallinity |
| 4 | 260 | Line (1,H) | Glossy with very slight haze | Largely smectic, slight α-form crystallinity |
| 5 | 270 | Line (1,H) | Coating fibrillation and damage | |
| 6 | 250 | Spray (1,H) | Mottled, reduced gloss | High α-form crystallinity content |
| 7 | 250 | Line (2,V) | Glossy, no haze | Smectic |
| 8 | 250 | Line (1,H) | Glossy with some haze | Moderate α-form crystallinity present |
| 9 | 250 | Line (2,H) | Glossy with very slight haze | As 1 |
| 10 | 250 | Line (1,H) | Glossy with very slight haze | As 1 |
| 11 | 250 | Spray (1,H) | Mottled, reduced gloss | As 6 |
| 12 | 250 | Line (2,H) | Glossy | Smectic |
| 13 | 250 | Air (A,H) | Dull with haze | Highly crystalline (as 6) |

Note: Structure measured by X-ray diffraction technique.

TABLE 4

| Example | Component | Coating Performance "Enamel Rater Value" (mA)$^2$ |
|---|---|---|
| 1 | Beverage can end shell | 0.2 ± 0.05 |
| 2 | Beverage can end shell | 0.2 ± 0.05 |
| 3 | Beverage can end shell | 0.2 ± 0.05 |
| 4 | Beverage can end shell | 0.2 ± 0.05 |
| 6 | Beverage can end shell | 4 to 8 |
| 7 | Beverage can end shell | <0.1 |
| 10 | Complete ring-pull | 0.2 ± 0.05 |

TABLE 4-continued

| Example | Component | Coating Performance "Enamel Rater Value" (mA)[2] |
|---|---|---|
| 13 | beverage end Beverage can end shell | >10 |

Notes:
1. Can end diameter 65 mm.
2. Can ends were immersed in a sodium chloride solution and ultrasonically agitated for 30 secnds; the ends were "normal rated" using a conventional enamel rater device operating at 6.3V and current measured in milliamperes. The test electrolyte contained sodium chloride and a surfactant.

TABLE 5

| Example | Component | Polypropylene Coating 4 Performance |
|---|---|---|
| 11 | Food can end | Can end panel unaffected. Random underfilm dark discolouration on areas of worked metal (expansion rings and countersink) |
| 12 | Food can end | Can end unaffected. |

Note:
1. Can end of 73 mm diameter.
2. Ends were seamed onto welded seam can bodies, the bodies filled with an acetic acid/sodium chloride solution, a top end seamed on and the can retorted for an hour at 121° C. Cans were cooled and opened after twenty four hours. The ends were examined visually.

I claim:

1. A process for producing a material comprised of a strip of polypropylene film which is substantially free of α-form crystallinity laminated to a metal sheet so that the laminate will be discontinuity-free if deformed, the process comprising the steps of:
    preheating the metal sheet to a temperature above the softening point of the polypropylene;
    laminating a strip of polypropylene film to at least one of the major surfaces of the preheated metal sheet by passing the strip of polypropylene film and the preheated metal sheet between pinch rolls;
    subjecting the laminate to a temperature above the melting point of the polypropylene;
    advancing the laminate through ambient space above a liquid container; and
    rapidly and uniformly cooling the laminate to a temperature substantially below the melting point of the polypropylene by directing an unbroken, continuous, flow of cooling liquid pumped onto the polypropylene coated surface of the advancing laminate across its entire width to travel on the surface of the advancing laminate, in the same direction, as the laminate moves in the ambient space above the liquid container, so that the laminated polypropylene film is cooled through its melting point at a rate exceeding 200° C. per second.

2. A process according to claim 1 wherein the laminated polypropylene film is cooled to a temperature not exceeding its softening point.

3. A process according to claim 1 wherein the cooling liquid is water at room temperature.

4. A process according to claim 1 wherein the polypropylene film strip is a co-extruded multi-layer strip of film comprising an inner layer of a bonding resin which is an acid-modified polypropylene and an outer layer of polypropylene.

5. A process according to claim 4 wherein the bonding resin is a maleic anhydride modified polypropylene.

6. A process according to claim 1 wherein the strip of polypropylene film is laminated to the metal sheet with the metal sheet at a temperature $T_1$ which is sufficient to cause softening of the polypropylene film but is below the temperature at which the outer surface of the polypropylene film would be damaged during lamination, and the resultant laminate is reheated to a temperature $T_2$ which is above the melting point of the propylene, followed by the rapid and uniform cooling.

7. A process according to claim 6 wherein the temperature $T_1$ is in the range from 120° C. to 230° C. and the temperature $T_2$ is in the range from 210° C. to 270° C.

8. A process according to claim 1 wherein another strip of polymer film is simultaneously laminated to the other major surface of the metal sheet.

9. A process according to claim 1 wherein the metal sheet is electrolytically chromium coated steel with a dual layer of chromium metal and chromium oxide.

10. A process according to claim 1 wherein the laminate is rapidly and uniformly cooled to a temperature substantially below the melting point of the polypropylene at a rate on the order of 200° C./sec.

11. A process according to claim 1 wherein the strip of polypropylene film is a co-extruded multi-layer strip of film.

12. A process for producing a material comprised of a strip of polypropylene film laminated to a metal sheet, the process comprising the steps of:
    preheating the metal sheet to a temperature above the softening point of the polypropylene;
    laminating a strip of polypropylene film to at least one of the major surfaces of the preheated metal sheet by passing the strip of polypropylene film and the preheated metal sheet between pinch rolls;
    subjecting the laminate to a temperature above the melting point of the polypropylene;
    advancing the laminate through ambient space above a liquid container; and
    rapidly and uniformly cooling the laminate to a temperature substantially below the melting point of the polypropylene by directing an unbroken, continuous, flow of cooling liquid pumped onto the polypropylene coated surface of the advancing laminate across its entire width to travel on the surface of the advancing laminate, in the same direction, as the laminate moves in the ambient space above the liquid container, so that the laminated polypropylene film is rapidly and uniformly cooled to a temperature substantially below the melting point of the polypropylene at a rate of the order of 200° C. per second.

13. A process for producing a material comprised of a strip of polypropylene film laminated to a metal sheet, the process comprising the steps of:
    preheating the metal sheet to a temperature above the softening point of the polypropylene;
    laminating a strip of polypropylene film, which is a co-extruded multi-layer strip of film comprising an inner layer of a bonding resin which is an acid-modified polypropylene and an outer layer of polypropylene, to at least one of the major surfaces of the preheated metal sheet by passing the strip of polypropylene film and the preheated metal sheet between pinch rolls;
    subjecting the laminate to a temperature above the melting point of the polypropylene;
    advancing the laminate through ambient space above a liquid container; and
    rapidly and uniformly cooling the laminate to a temperature substantially below the melting point of the polypropylene by directing an unbroken, continuous, flow of cooling liquid pumped onto the polypropylene coated surface of the advancing laminate across its entire width to travel on the surface of the advancing laminate, in the same direction, as the laminate moves in the ambient space above the liquid container.

14. A process according to claim 13 wherein the bonding resin is a maleic anhydride modified polypropylene.

15. A process for producing a material comprised of a strip of polypropylene film laminated to a metal sheet, the process comprising the steps of:

preheating the metal sheet to a temperature above the softening point of the polypropylene;

laminating a strip of polypropylene film to at least one of the major surfaces of the preheated metal sheet, with the metal sheet at a temperature $T_1$ which is sufficient to cause softening of the polypropylene film, but is below the temperature at which the outer surface of the polypropylene film would be damaged during lamination, by passing the strip of polypropylene film and the preheated metal sheet between pinch rolls;

subjecting the resulting laminate to a temperature $T_2$ which is above the melting point of the polypropylene;

advancing the laminate through ambient space above a liquid container; and rapidly and uniformly cooling the laminate to a temperature substantially below the melting point of the polypropylene by directing an unbroken, continuous, flow of cooling liquid pumped onto the polypropylene coated surface of the advancing laminate across its entire width to travel on the surface of the advancing laminate, in the same direction, as the laminate moves in the ambient space above the liquid container.

16. A process according to claim 15 wherein the temperature $T_1$ is in the range from 120° C. to 230° C. and the temperature $T_2$ is in the range of from 210° C. to 270° C.

* * * * *